(12) United States Patent
Heninger et al.

(10) Patent No.: US 9,088,479 B2
(45) Date of Patent: *Jul. 21, 2015

(54) AUTOMATICALLY SELECTING APPROPRIATE PLATFORM TO RUN APPLICATION IN CLOUD COMPUTING ENVIRONMENT

(71) Applicant: International Business Machines Corporation, Armonk, NY (US)

(72) Inventors: Ivan M. Heninger, Selma, NC (US); Curtis Hrischuk, Holly Springs, NC (US); Steven D. Ims, Apex, NC (US); Zachary H. Jones, Apex, NC (US); Aaron J. Quirk, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 9 days.

This patent is subject to a terminal disclaimer.

(21) Appl. No.: 13/859,212

(22) Filed: Apr. 9, 2013

(65) Prior Publication Data
US 2013/0227132 A1 Aug. 29, 2013

Related U.S. Application Data

(63) Continuation of application No. 13/356,811, filed on Jan. 24, 2012.

(51) Int. Cl.
*G06F 11/30* (2006.01)
*H04L 12/26* (2006.01)
(Continued)

(52) U.S. Cl.
CPC .............. *H04L 43/04* (2013.01); *G06F 9/5044* (2013.01); *G06F 11/3409* (2013.01); *G06F 11/3419* (2013.01); *G06F 11/3664* (2013.01); *G06F 11/3688* (2013.01); *G06F 8/71* (2013.01); *H04L 29/08072* (2013.01)

(58) Field of Classification Search
CPC ..... G06F 9/5044; G06F 9/44; G06F 9/45504; G06F 11/3476; G06F 11/3428; G06F 12/023; G06F 15/173; H04L 43/04
USPC .................... 702/186; 717/124, 120; 709/224
See application file for complete search history.

(56) References Cited

U.S. PATENT DOCUMENTS 8,219,358 B2 7/2012 Yatko et al.
2009/0281770 A1 * 11/2009 Yatko et al. ................... 702/186
(Continued)

OTHER PUBLICATIONS

Mell et al., "The NIST Definition of Cloud Computing," Special Publication 800-145, Sep. 2011.
(Continued)

*Primary Examiner* — Kyung H Shin
(74) *Attorney, Agent, or Firm* — Robert A. Voigt, Jr.; Winstead, P.C.

(57) ABSTRACT

A method, system and computer program product for selecting an appropriate platform to run an application deployed in a cloud computing environment. The appropriate platform is selected by employing a two phase process, where the first phase occurs prior to the deployment of the application and the second phase occurs after the application has been deployed. In the first phase, the cloud computing node selects a platform using various factors, such as application binaries, application metadata and artifacts, and qualities of service and application requirements. In the second phase, the cloud computing node determines whether an alternative platform needs to be implemented for subsequent deployments of the application using various factors, such as application runtime metrics and garbage collection metrics. In this manner, an appropriate platform is automatically selected thereby removing the requirement for the user to indicate the type of platform for the target environment.

7 Claims, 5 Drawing Sheets

(51) Int. Cl.
*G06F 11/34* (2006.01)
*G06F 11/36* (2006.01)
*G06F 9/50* (2006.01)
*G06F 9/44* (2006.01)
*H04L 29/08* (2006.01)

(56) References Cited

U.S. PATENT DOCUMENTS

2009/0300151 A1 12/2009 Friedman et al.
2010/0106812 A1 4/2010 Bernabeu-Auban et al.
2011/0314466 A1 12/2011 Berg et al.
2011/0320606 A1 12/2011 Madduri et al.
2012/0222005 A1* 8/2012 Harris et al. .................. 717/120
2013/0080999 A1* 3/2013 Yang .............................. 717/124

OTHER PUBLICATIONS

Office Action for U.S. Appl. No. 13/356,811 dated Jan. 31, 2014, pp. 1-17.
Office Action for U.S. Appl. No. 13/356,811 dated Jul. 21, 2014, pp. 1-26.

* cited by examiner

AUTOMATICALLY SELECTING APPROPRIATE PLATFORM TO RUN APPLICATION IN CLOUD COMPUTING ENVIRONMENT

CROSS-REFERENCE TO RELATED APPLICATIONS

The present application is a continuation application of pending U.S. patent application Ser. No. 13/356,811, which was filed on Jan. 24, 2012, which is assigned to the assignee of the present invention. The present application claims priority benefits to U.S. patent application Ser. No. 13/356,811.

TECHNICAL FIELD

The present invention relates to cloud computing, and more particularly to automatically selecting an appropriate platform (e.g., 32-bit platform, 64-bit platform) to run an application deployed in the cloud computing environment.

BACKGROUND

In a cloud computing environment, computing is delivered as a service rather than a product, whereby shared resources, software and information are provided to computers and other devices as a metered service over a network, such as the Internet. In such an environment, computation, software, data access and storage services are provided to users that do not require knowledge of the physical location and configuration of the system that delivers the services.

Currently, application developers are required to decide which platform (e.g., 32-bit platform, 64-bit platform) to run their software deployed to the cloud computing environment. Such a decision has implications on both runtime performance as well as efficient use of memory. For example, in some circumstances, an application may run faster on a 64-bit platform rather than on a 32-bit platform at a cost of a larger memory footprint (program using or referencing a greater amount of memory while running). Conversely, some applications run slower in a 64-bit environment though they have access to a greater amount of memory. Most application developers are not performance and memory experts, and hence they will have a difficult time in selecting the appropriate platform to optimize runtime performance and memory utilization.

BRIEF SUMMARY

In one embodiment of the present invention, a method for selecting an appropriate platform to run an application deployed in a cloud computing environment comprises receiving application binaries. The method further comprises receiving qualities of service and application requirements. In addition, the method comprises analyzing the received application binaries. Additionally, the method comprises analyzing the received qualities of service and application requirements. Furthermore, the method comprises selecting, by a processor, a first platform to run the application to be deployed in the cloud computing environment based on the analyzing of the received application binaries and the analyzing of the received qualities of service and application requirements.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Figure 1:
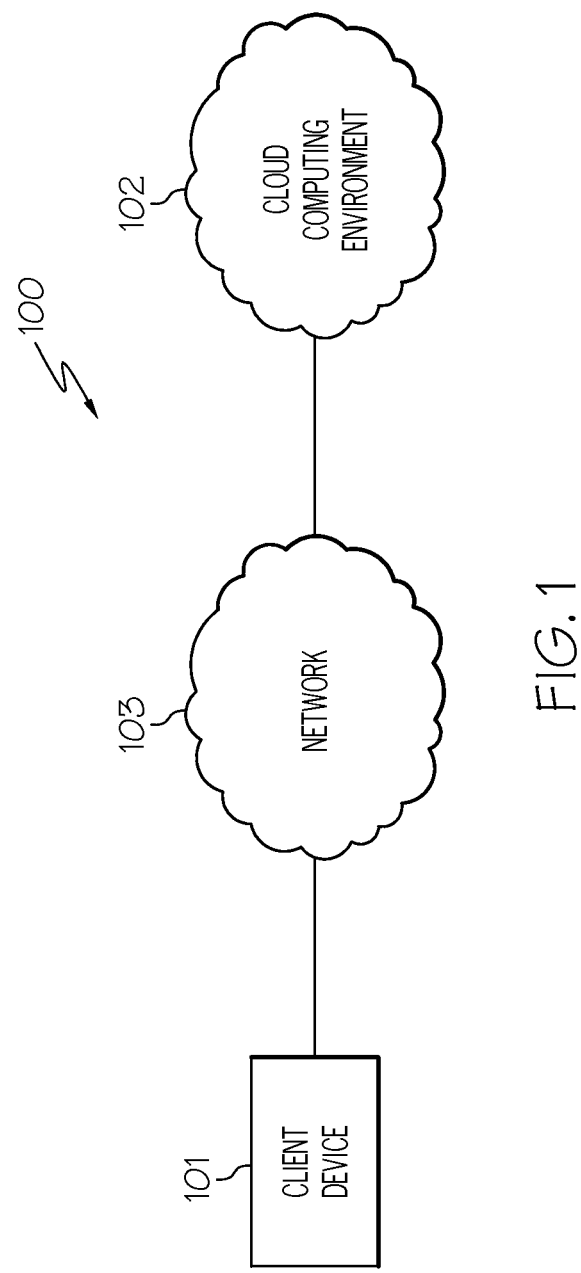
FIG. 1 illustrates a network system configured in accordance with an embodiment of the present invention.

The present invention comprises a method, system and computer program product for selecting an appropriate platform to run an application deployed in a cloud computing environment. In one embodiment of the present invention, the appropriate platform (i.e., the ideal runtime environment for the application to be deployed onto the cloud computing environment) is selected by employing a two phase process, where the first phase occurs prior to the deployment of the application onto the cloud computing environment and the second phase occurs after the application has been deployed onto the cloud computing environment. In the first phase, the cloud computing node selects the platform (e.g., 32-bit platform) that optimizes runtime performance and memory utilization using various factors, such as application binaries, application metadata and artifacts, and qualities of service and application requirements. In the second phase, the cloud computing node determines whether an alternative platform needs to be implemented for subsequent deployments of the application to optimize runtime performance and memory utilization using various factors, such as application runtime metrics and garbage collection metrics. In this manner, the cloud computing node automatically selects an appropriate platform (e.g., 32-bit platform, 64-bit platform) to optimize runtime performance and memory utilization thereby removing the requirement for the user to indicate the type of platform (e.g., memory address bus width) for the target environment.

While the following discusses the present invention in connection with selecting either the 32-bit platform or the 64-bit platform, the principles of the present invention may be applied to selecting any memory address bus width that optimizes runtime performance and memory utilization. A person of ordinary skill in the art would be capable of applying the principles of the present invention to such implementations. Further, embodiments applying the principles of the present invention to such implementations would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

It is understood in advance that although this disclosure includes a detailed description on cloud computing, implementation of the teachings recited herein are not limited to a cloud computing environment. Rather, the embodiments of the present invention are capable of being implemented in conjunction with any type of clustered computing environment now known or later developed.

In any event, the following definitions have been derived from the "The NIST Definition of Cloud Computing" by Peter Mell and Timothy Grance, dated September 2011, which is cited on an Information Disclosure Statement filed herewith, and a copy of which is provided to the U.S. Patent and Trademark Office.

Cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

Characteristics are as follows:

On-Demand Self-Service: A consumer can unilaterally provision computing capabilities, such as server time and network storage, as needed, automatically without requiring human interaction with each service's provider.

Broad Network Access: Capabilities are available over a network and accessed through standard mechanisms that promote use by heterogeneous thin or thick client platforms (e.g., mobile phones, tablets, laptops and workstations).

Resource Pooling: The provider's computing resources are pooled to serve multiple consumers using a multi-tenant model, with different physical and virtual resources dynamically assigned and reassigned according to consumer demand. There is a sense of location independence in that the consumer generally has no control or knowledge over the exact location of the provided resources but may be able to specify location at a higher level of abstraction (e.g., country, state or data center). Examples of resources include storage, processing, memory and network bandwidth.

Rapid Elasticity: Capabilities can be elastically provisioned and released, in some cases automatically, to scale rapidly outward and inward commensurate with demand. To the consumer, the capabilities available for provisioning often appear to be unlimited and can be purchased in any quantity at any time.

Measured Service: Cloud systems automatically control and optimize resource use by leveraging a metering capability at some level of abstraction appropriate to the type of service (e.g., storage, processing, bandwidth and active user accounts). Resource usage can be monitored, controlled and reported providing transparency for both the provider and consumer of the utilized service.

Service Models are as follows:

Software as a Service (SaaS): The capability provided to the consumer is to use the provider's applications running on a cloud infrastructure. The applications are accessible from various client devices through either a thin client interface, such as a web browser (e.g., web-based e-mail) or a program interface. The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages, libraries, services and tools supported by the provider. The consumer does not manage or control the underlying cloud infrastructure including networks, servers, operating systems or storage, but has control over the deployed applications and possibly configuration settings for the application-hosting environment.

Infrastructure as a Service (IaaS): The capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems, storage and deployed applications; and possibly limited control of select networking components (e.g., host firewalls).

Deployment Models are as follows:

Private Cloud: The cloud infrastructure is provisioned for exclusive use by a single organization comprising multiple consumers (e.g., business units). It may be owned, managed and operated by the organization, a third party or some combination of them, and it may exist on or off premises.

Community Cloud: The cloud infrastructure is provisioned for exclusive use by a specific community of consumers from organizations that have shared concerns (e.g., mission, security requirements, policy and compliance considerations). It may be owned, managed and operated by one or more of the organizations in the community, a third party, or some combination of them, and it may exist on or off premises.

Public Cloud: The cloud infrastructure is provisioned for open use by the general public. It may be owned, managed and operated by a business, academic or government organization, or some combination of them. It exists on the premises of the cloud provider.

Hybrid Cloud: The cloud infrastructure is a composition of two or more distinct cloud infrastructures (private, community or public) that remain unique entities, but are bound together by standardized or proprietary technology that enables data and application portability (e.g., cloud bursting for load balancing between clouds).

Referring now to the Figures in detail, FIG. 1 illustrates a network system 100 configured in accordance with an embodiment of the present invention. Network system 100 includes a client device 101 connected to a cloud computing environment 102 via a network 103. Client device 101 may be any type of computing device (e.g., portable computing unit, personal digital assistant (PDA), smartphone, laptop computer, mobile phone, navigation device, game console, desktop computer system, workstation, Internet appliance and the like) configured with the capability of connecting to cloud computing environment 102 via network 103.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Cloud computing environment 102 is used to deliver computing as a service to client device 101 implementing the model discussed above. An embodiment of cloud computing environment 102 is discussed below in connection with FIG. 2.

Figure 2:
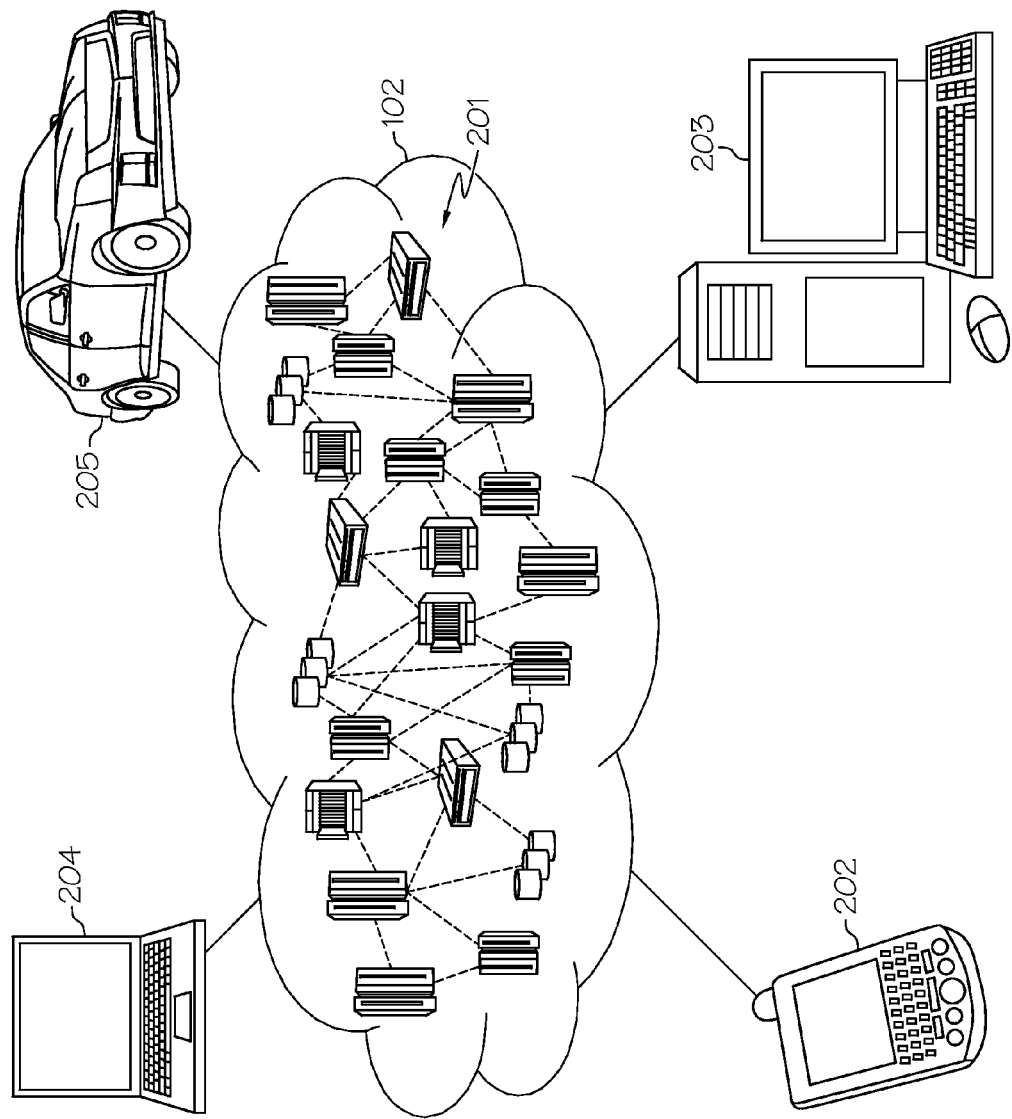
FIG. 2 illustrates a cloud computing environment in accordance with an embodiment of the present invention.

FIG. 2 illustrates cloud computing environment 102 in accordance with an embodiment of the present invention. As shown, cloud computing environment 102 includes one or more cloud computing nodes 201 with which local computing devices used by cloud consumers, such as, for example, personal digital assistant (PDA) or cellular telephone 202, desktop computer 203, laptop computer 204, and/or automobile computer system 205 may communicate. Nodes 201 may communicate with one another. They may be grouped (not shown) physically or virtually, in one or more networks, such as Private, Community, Public, or Hybrid clouds as described hereinabove, or a combination thereof. This allows cloud computing environment 102 to offer infrastructure, platforms and/or software as services for which a cloud consumer does not need to maintain resources on a local computing device. A description of a schematic of an exemplary cloud computing node 201 is provided below in connection with FIG. 3. It is understood that the types of computing devices 202, 203, 204, 205 shown in FIG. 2, which may represent client device 101 of FIG. 1, are intended to be illustrative and that cloud computing nodes 201 and cloud computing environment 102 can communicate with any type of computerized device over any type of network and/or network addressable connection (e.g., using a web browser). Program code located on one of nodes 201 may be stored on a computer recordable storage medium in one of nodes 201 and downloaded to computing devices 202, 203, 204, 205 over a network for use in these computing devices. For example, a server computer in computing nodes 201 may store program code on a computer readable storage medium on the server computer. The server computer may download the program code to computing device 202, 203, 204, 205 for use on the computing device.

Figure 3:
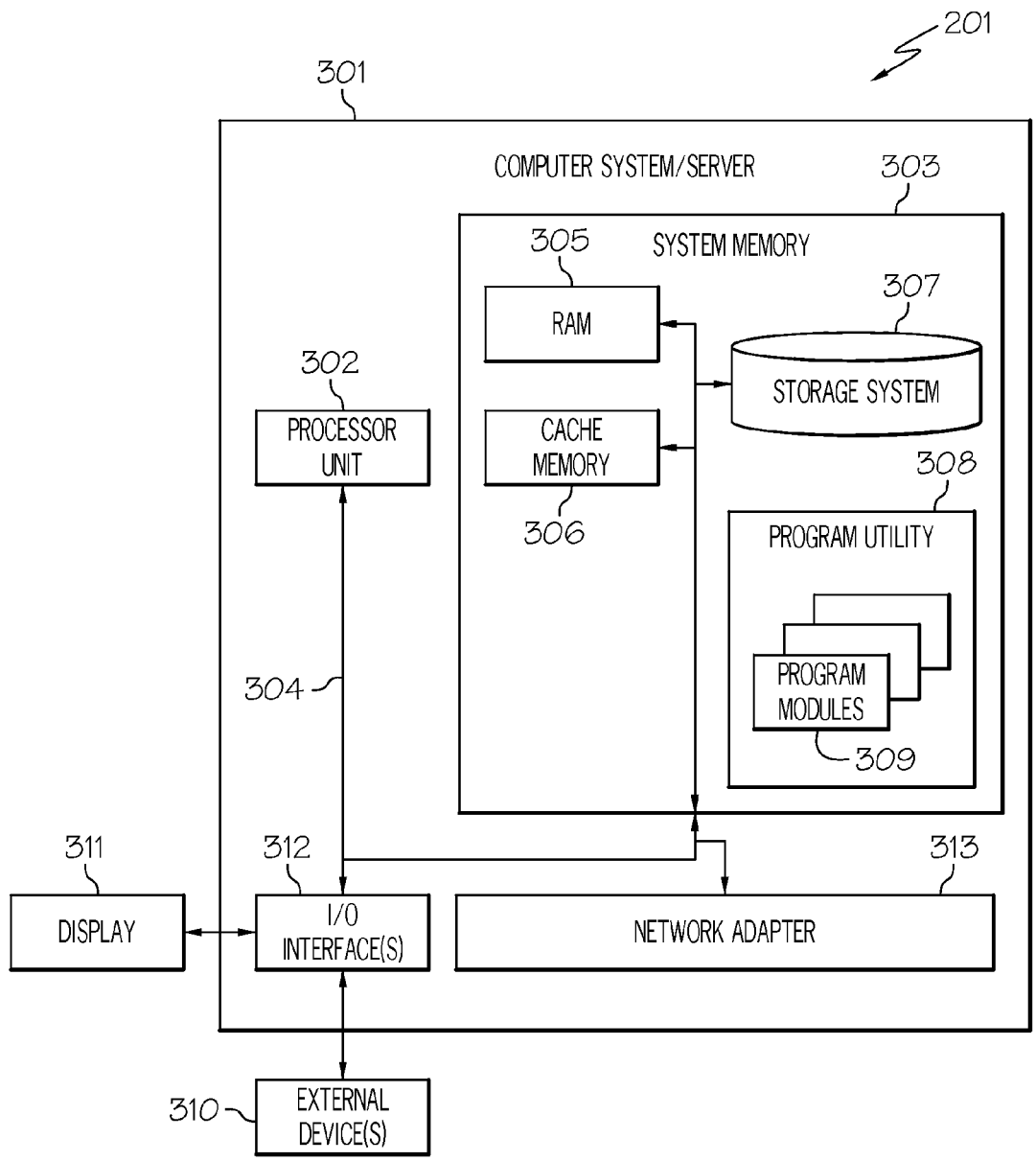
FIG. 3 illustrates a schematic of an exemplary cloud computing node in accordance with an embodiment of the present invention.

Referring now to FIG. 3, FIG. 3 illustrates a schematic of an exemplary cloud computing node 201 (FIG. 2) in accordance with an embodiment of the present invention. Cloud computing node 201 is only one example of a suitable cloud computing node and is not intended to suggest any limitation as to the scope of use or functionality of embodiments of the present invention described herein. Regardless, cloud computing node 201 is capable of being implemented and/or performing any of the functionality set forth herein.

In cloud computing node 201, there is a computer system/server 301, which is operational with numerous other general purpose or special purpose computing system environments or configurations. Examples of well-known computing systems, environments, and/or configurations that may be suitable for use with computer system/server 301 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 301 may be described in the general context of computer system-executable instructions, such as program modules, being performed by a computer system. Generally, program modules may include routines, programs, objects, components, logic, data structures, and so on that perform particular tasks or implement particular abstract data types. Computer system/server 301 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 301 in cloud computing node 201 is shown in the form of a general-purpose computing device. The components of computer system/server 301 may include, but are not limited to, one or more processors or processor unit 302, a system memory 303 and a bus 304 that couples various system components including system memory 303 to processor unit 302.

Processor unit 302 executes instructions for software that may be loaded into system memory 303. Processor unit 302 may be a number of processors, a multi-processor core or some other type of processor, depending on the particular implementation. A number, as used herein with reference to an item, means one or more items. Further, processor unit 302 may be implemented using a number of heterogeneous processor systems in which a main processor is present with secondary processors on a single chip. As another illustrative example, processor unit 302 may be a symmetric multi-processor system containing multiple processors of the same type.

Bus 304 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 301 typically includes a variety of computer system readable media. Such media may be any available media that is accessible by computer system/server 301, and it includes both volatile and non-volatile media, removable and non-removable media.

System memory 303 can include computer system readable media in the form of volatile memory, such as random access memory (RAM) 305 and/or cache memory 306. Computer system/server 301 may further include other removable/non-removable, volatile/non-volatile computer system storage media. By way of example only, storage system 307 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 304 by one or more data media interfaces. As will be further depicted and described below, memory 303 may include at least one program product having a set (e.g., at least one) of program modules that are configured to carry out the functions of embodiments of the present invention.

Program/utility 308, having a set (at least one) of program modules 309, may be stored in memory 303 by way of example, and not limitation, as well as an operating system, one or more application programs, other program modules, and program data. Each of the operating system, one or more application programs, other program modules, and program data or some combination thereof, may include an implementation of a networking environment. Program modules 309 generally carry out the functions and/or methodologies of embodiments of the present invention as described herein.

Computer system/server 301 may also communicate with one or more external devices 310 such as a keyboard, a pointing device, a display 311, etc.; one or more devices that enable a user to interact with computer system/server 301; and/or any devices (e.g., network card, modem, etc.) that enable computer system/server 301 to communicate with one or more other computing devices. Such communication can occur via I/O interfaces 312. Still yet, computer system/server 301 can communicate with one or more networks such as a local area network (LAN), a general wide area network (WAN), and/or a public network (e.g., the Internet) via network adapter 313. As depicted, network adapter 313 communicates with the other components of computer system/server 301 via bus 304. It should be understood that although not shown, other hardware and/or software components could be used in conjunction with computer system/server 301. Examples, include, but are not limited to: microcode, device drivers, redundant processing units, external disk drive arrays, RAID systems, tape drives, data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, application developers are currently required to decide which platform (e.g., 32-bit platform, 64-bit platform) to run their software deployed to the cloud computing environment. Such a decision has implications on both runtime performance as well as efficient use of memory. For example, in some circumstances, an application may run faster on a 64-bit platform rather than on a 32-bit platform at a cost of a larger memory footprint (program using or referencing a greater amount of memory while running) Conversely, some applications run slower in a 64-bit environment though they have access to a greater amount of memory. Most application developers are not performance and memory experts, and hence they will have a difficult time in selecting the appropriate platform to optimize runtime performance and memory utilization.

Figure 4:
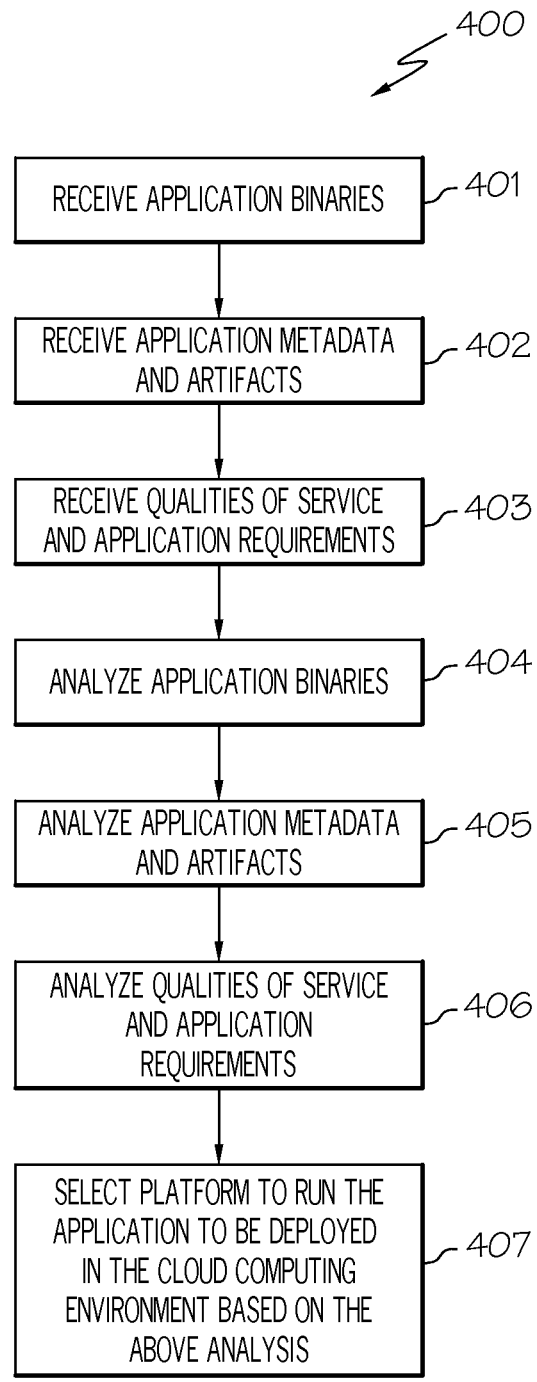
FIG. 4 is a flowchart of a method for determining the appropriate platform to run the application prior to the deployment of the application onto the cloud computing environment in accordance with an embodiment of the present invention.
Figure 5:
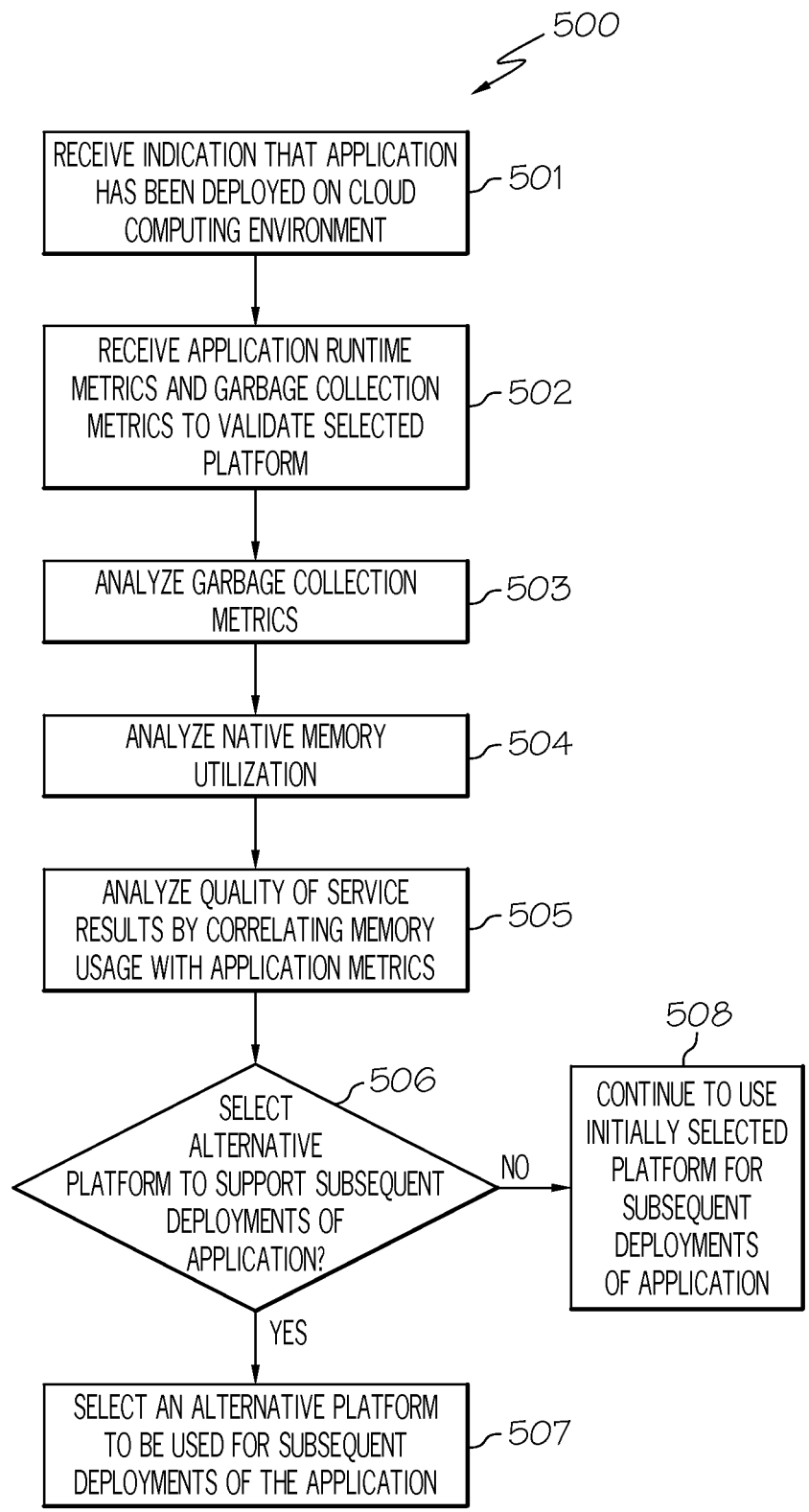
FIG. 5 is a flowchart of a method for validating the decision of the platform selected in the first phase after the application has been deployed onto the cloud computing environment in accordance with an embodiment of the present invention.

The principles of the present invention provide a means for a cloud computing node 201 (FIGS. 2 and 3) to automatically select an appropriate platform (e.g., 32-bit platform, 64-bit platform) to optimize runtime performance and memory utilization thereby removing the requirement for the user to indicate the type of platform (e.g., memory address bus width) of their target environment as discussed below in connection with FIGS. 4-5. In one embodiment, the appropriate platform (i.e., the ideal runtime environment for the application to be deployed onto cloud computing environment 102 of FIGS. 1 and 2) is selected by employing a two phase process, where the first phase (discussed in connection with FIG. 4) occurs prior to the deployment of the application onto cloud computing environment 102 and the second phase (discussed in connection with FIG. 5) occurs after the application has been deployed onto cloud computing environment 102. FIG. 4 is a flowchart of a method for determining the appropriate platform to run the application prior to the deployment of the application onto cloud computing environment 102. FIG. 5 is a flowchart of a method for validating the decision of the platform selected in the first phase after the application has been deployed onto cloud computing environment 102.

FIG. 4 is a flowchart of a method 400 for determining the appropriate platform to run the application prior to the deployment of the application onto cloud computing environment 102 in accordance with an embodiment of the present invention.

Referring to FIG. 4, in conjunction with FIGS. 1-3, in step 401, cloud computing node 201 receives application binaries (e.g., Java® class files, binaries written in non-interpreted programming languages) from the user.

In step 402, cloud computing node 201 receives application metadata and artifacts. Metadata refers to data providing information about one or more aspects of the data, such as the purpose of the data, time and date of creation, standards used, etc. Artifacts refer to the tangible by-products (e.g., use cases, class diagrams, UML models, design documents) produced during the development of software.

In step 403, cloud computing node 201 receives qualities of service and application requirements. For example, qualities of service and application requirements guarantee a certain level of performance. For example, a required bit rate, delay, jitter, packet dropping probability and/or bit error rate may be guaranteed.

In step 404, cloud computing node 201 analyzes the received application binaries in connection with determining which platform is to be selected to run the application to be deployed in cloud computing environment 102 as discussed further below. For example, the analysis may involve determining whether the application significantly utilizes BigInteger operations that can be optimized in a 64-bit platform. In another example, the analysis may involve determining whether the application utilizes 32-bit native libraries that may negate the consideration of using a 64-bit platform.

In step 405, cloud computing node 201 analyzes the received application metadata and artifacts in connection with determining which platform is to be selected to run the application to be deployed in cloud computing environment 102 as discussed further below. For example, the analysis may involve detecting if the application serves as a cache for other applications. By serving as a cache for other applications, a larger memory size for the heap may be required thereby necessitating a platform with a greater memory address bus width (e.g., 64-bit platform versus a 32-bit platform). In another example, the analysis may involve determining if the service leverages an internal cache of a target application server. By leveraging an internal cache of a target application server, a smaller memory address bus width may be required.

In step 406, cloud computing node 201 analyzes the received qualities of service and application requirements in connection with determining which platform is to be selected to run the application to be deployed in cloud computing environment 102 as discussed further below. For example, the analysis may involve determining whether the user has specified an explicit minimum/maximum memory requirement. For instance, if the minimum and maximum memory requirements may be satisfied with a 32-bit platform, then a 32-bit platform may be selected. However, if the minimum memory requirement requires a 64-bit platform, then a 64-bit platform may be selected. In another example, the analysis may involve determining whether there is a quality of service that could not be guaranteed due to the garbage collection pauses associated with large heaps. Garbage collection may have a nondeterministic impact on execution time by potentially introducing pauses into the execution of a program which are not correlated with the algorithm being processed. If the pauses cause the quality of service (e.g., latency) for a given platform (e.g., 32-bit platform) to not be guaranteed, then an alternative platform (e.g., 64-bit platform) may be selected.

In step 407, cloud computing node 201 selects the platform (e.g., 32-bit platform) to run the application to be deployed in cloud computing environment 102 based on the analysis discussed above in steps 404-406. In such analysis, an initial decision is made as to select a particular platform (e.g., 32-bit platform, 64-bit platform) that optimizes runtime performance and memory utilization using the factors (e.g., application binaries, application metadata and artifacts, and qualities of service and application requirements) discussed above.

In some implementations, method 400 may include other and/or additional steps that, for clarity, are not depicted. Further, in some implementations, method 400 may be executed in a different order presented and that the order presented in the discussion of FIG. 4 is illustrative. Additionally, in some implementations, certain steps in method 400 may be executed in a substantially simultaneous manner or may be omitted.

After the initial deployment of the application onto cloud computing environment 102, the application runtime metrics are used to validate the platform selected by cloud computing node 201 in step 407 of method 400. Such validation occurs in a second phase as discussed below in connection with FIG. 5. If the application runtime metrics indicate that the current environment (i.e., the selected platform) provides optimum performance, the selected platform will continue to be used for subsequent deployments of this application. However, if the application runtime metrics indicate that another platform would enable better performance, then such a platform will be used for subsequent deployments of the application.

FIG. 5 is a flowchart of a method 500 for validating the decision of the platform selected in the first phase after the application has been deployed onto cloud computing environment 102 in accordance with an embodiment of the present invention.

Referring to FIG. 5, in conjunction with FIGS. 1-3, in step 501, cloud computing node 201 receives an indication that the application has been deployed onto cloud computing environment 102.

In step 502, cloud computing node 201 receives application runtime metrics and garbage collection metrics to validate the platform selected by cloud computing node 201 in step 407 of method 400. Application runtime metrics include native memory utilization logs which provide information regarding native memory utilization, where native memory refers to the memory managed by the operating system. Garbage collection metrics include garbage collection logs that provide information regarding the process (e.g., rate of collection) in reclaiming garbage or memory occupied by objects that are no longer in use by the program. Garbage collection, as used herein, refers to any type of automatic memory management. Garbage collection is not to be limited in scope to the use of garbage collection in Java®.

In step 503, cloud computing node 201 analyzes the garbage collection metrics in connection with validating the platform selected by cloud computing node 201 in step 407 of method 400 as discussed further below. For example, the analysis may involve determining whether the rate of garbage collection is too fast or slow. If it is too slow, then a platform with a greater memory address bus width may be desired. Conversely, if it is too fast, then a platform with a smaller memory address bus width may be desired. In another example, the analysis may involve determining whether the pause time during the garbage collection is acceptable for the indicated qualities of service. If not, then an alternative platform may be desired.

In step 504, cloud computing node 201 analyzes the native memory utilization in connection with validating the platform selected by cloud computing node 201 in step 407 of method 400 as discussed further below. For example, the analysis may involve utilizing native memory utilization logs which provide information regarding utilization patterns. For instance, if memory is not being utilized greatly, then a platform with a smaller memory address bus width may be desired.

In step 505, cloud computing node 201 analyzes the quality of service results by correlating the memory usage with the received application runtime metrics in connection with validating the platform selected by cloud computing node 201 in step 407 of method 400 as discussed further below. For example, the analysis may involve determining whether the qualities of service are being met in worst case situations where garbage collection pauses occur. If such qualities of services are not being met, then an alternative platform may be desired.

In step 506, a determination is made by cloud computing node 201 as to whether to select an alternative the platform to support subsequent deployments of the application based on the analysis discussed above in steps 503-505. In such analysis, a decision is made as to whether an alternative platform to the one initially selected in step 407 of method 400 needs to be implemented for subsequent deployments of the application to optimize runtime performance and memory utilization using the factors (e.g., application runtime metrics, garbage collection metrics) discussed above.

If an alternative platform is to be used to optimize runtime performance and memory utilization for subsequent deployments of the application, then, in step 507, cloud computing node 201 selects an alternative platform to be used for subsequent deployments of the application.

If, however, an alternative platform is not to be used to optimize runtime performance and memory utilization for subsequent deployments of the application, then, in step 508, the initially selected platform is continued to be used for subsequent deployments of the application.

In this manner, the initial selection of the platform to run the application deployed on cloud computing environment 102 is validated using actual user load.

In some implementations, method 500 may include other and/or additional steps that, for clarity, are not depicted. Further, in some implementations, method 500 may be executed in a different order presented and that the order presented in the discussion of FIG. 5 is illustrative. Additionally, in some implementations, certain steps in method 500 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for selecting an appropriate platform to run an application deployed in a cloud computing environment, the method comprising:
receiving application binaries;
receiving qualities of service and application requirements;
analyzing said received application binaries;
analyzing said received qualities of service and application requirements; and
selecting, by a processor, a first platform to run said application to be deployed in said cloud computing environment based on said analyzing of said received application binaries and said analyzing of said received qualities of service and application requirements;
wherein application runtime metrics are used to validate said first platform selected to run said application, wherein a second platform is selected to run said application in response to said application runtime metrics indicating that said second platform would enable better performance.

2. The method as recited in claim 1 further comprising:
receiving application metadata and artifacts; and
analyzing said received application metadata and artifacts.

3. The method as recited in claim 2 further comprising:
selecting said first platform to run said application to be deployed in said cloud computing environment based on said analyzing of said received application binaries, said analyzing of said received qualities of service and application requirements and said analyzing of said received application metadata and artifacts.

4. The method as recited in claim 1 further comprising:
receiving said application runtime metrics and garbage collection metrics to validate said selection of said first platform.

5. The method as recited in claim 4 further comprising:
analyzing said garbage collection metrics;
analyzing native memory utilization; and
analyzing said qualities of service by correlating memory usage with said received application runtime metrics.

6. The method as recited in claim 5 further comprising:
selecting said second platform based on said analyzing of said garbage collection metrics, said analyzing of said native memory utilization and said analyzing of said qualities of service by correlating said memory usage with said received application runtime metrics.

7. The method as recited in claim 1, wherein said first platform is one of a 32-bit platform and a 64-bit platform.

* * * * *